UNITED STATES PATENT OFFICE.

SIGURD ARTHUR AANNERUD, OF ASKER, NEAR CHRISTIANIA, AND BIRGER FJELD HALVORSEN, OF CHRISTIANIA, NORWAY, ASSIGNORS TO NORSK HYDRO-ELEKTRISK KVAELSTOFAKTIESELSKAB, OF CHRISTIANIA, NORWAY.

IMPREGNATING COMPOSITION AND PROCESS FOR THE PRODUCTION THEREOF.

1,397,197.	Specification of Letters Patent.	Patented Nov. 15, 1921.

No Drawing.	Application filed October 13, 1920. Serial No. 416,755.

*To all whom it may concern:*

Be it known that we, SIGURD ARTHUR AANNERUD and BIRGER FJELD HALVORSEN, both subjects of the King of Norway, residing at Asker, near Christiania, and Christiania, Norway, respectively, have invented certain new and useful Improvements in Impregnating Composition and Processes for the Production Thereof; and we do hereby declare the following to be a full, clear, and exact description of the invention, such as will enable others skilled in the art to which it appertains to make and use the same.

This invention relates to the impregnation of materials and has for its object an impregnating composition by means of which tight and waterproof products can be produced. Hitherto a great number of impregnation substances have been suggested or employed for the purpose of producing air tight and waterproof fabrics and other webs. As such substances the following may be mentioned: oils, fats, resin, india-rubber, guttapercha, balata, viscose, glue, albumens, casein, asphalt, bitumen, tar, etc. All of these impregnation substances are, however, connected with several disadvantages, some being very expensive, others being brittle and others becoming adhesive, even when subjected to a very slightly raised temperature or becoming brittle when slightly cooled.

According to the present invention it is possible to produce an impregnating composition which is comparatively cheap, and which when applied to surfaces produces layers, which cannot be penetrated by air or water. In addition this composition is not connected with the drawbacks of known compositions as above referred to.

The composition comprises sulfurized tar, pitch or like heavy tar products mixed with sulfurized non-mineral oils as vegetable or animal oils with or without the addition of other substances. The composition is suitably produced by sulfurizing each of the components separately and then mixing the products and heating the mixture until the reaction is completed and a suitable consistency has been attained.

*Example I.*

200 kg. of rape seed oil and 40 kg. of sulfur were heated while being stirred, until the mass attains such a degree of viscidity, that it can be drawn into threads when cooled. At this stage of heating 300 kg. of prepared tar, which has been previously sulfurized with 51 kg. of sulfur is added while the mass is constantly stirred. The sulfurizing of oil and tar may also take place simultaneously, but the time required to complete the reaction will then be much longer, and it is difficult to control the reaction.

Instead of rape seed oil and similar oils, animal oils, such as whale oil or fish oils may be utilized. Thus the shark oil (oil of *somniosus microcephalus*) has been found to be especially advantageous and may be used in the following manner:

*Example II.*

150 kg. of the oil (of *somniosus microcephalus*) is heated and mixed with 60 kg. of sulfur, while stirring the mixture. The mass in maintained in a heated condition, until a sample by cooling becomes tough. At this stage 200 kg. of tar which has previously been sulfurized with 40 kg. of sulfur is added. The mass is heated, until a sample when cooled is not of a sticky character.

The composition may also be prepared by the use of a mixture of animal and vegetable oils.

The impregnating composition, containing more than ⅔ of tar, is less expensive than most of the impregnating substances hitherto employed. On account of its power of resisting chemical influences it is exceedingly well adapted as an impregnating means for packing for chemicals, so that it is made possible to use impregnated bags for substances which have hitherto been packed in barrels. The impregnated materials being water-tight, hydroscopic substances, such as Norge-salpeter (nitrate of lime) can readily be packed and stored for a longer period of time in bags impregnated with the described impregnating composition.

Claims:—

1. The process of producing an impregnating material which consists in sulfurizing heavy tar products, separately sulfurizing non-mineral oils, mixing the separately sulfurized resultant compounds, and heating the mixture until the reaction is completed and the desired consistency obtained.

2. The process of producing an impregnating material which consists in sulfurizing heavy tar products, separately sulfurizing fatty oils, mixing the separately sulfurized resultant compounds, and heating the mixture until the reaction is completed and the desired consistency obtained.

3. The process of producing an impregnating material which consists in sulfurizing tar, separately sulfurizing fatty oils, mixing the separately sulfurized resultant compounds, and heating the mixture until the reaction is completed and the desired consistency obtained.

In testimony that we claim the foregoing as our invention, we have signed our names in presence of two subscribing witnesses.

SIGURD ARTHUR AANNERUD.
BIRGER FJELD HALVORSEN.

Witnesses:
EDITH SKAUGEN,
STUART H. DE PUE.